J. P. DAY.
ADVERTISING CHART.
APPLICATION FILED NOV. 24, 1920.
1,374,365. Patented Apr. 12, 1921.
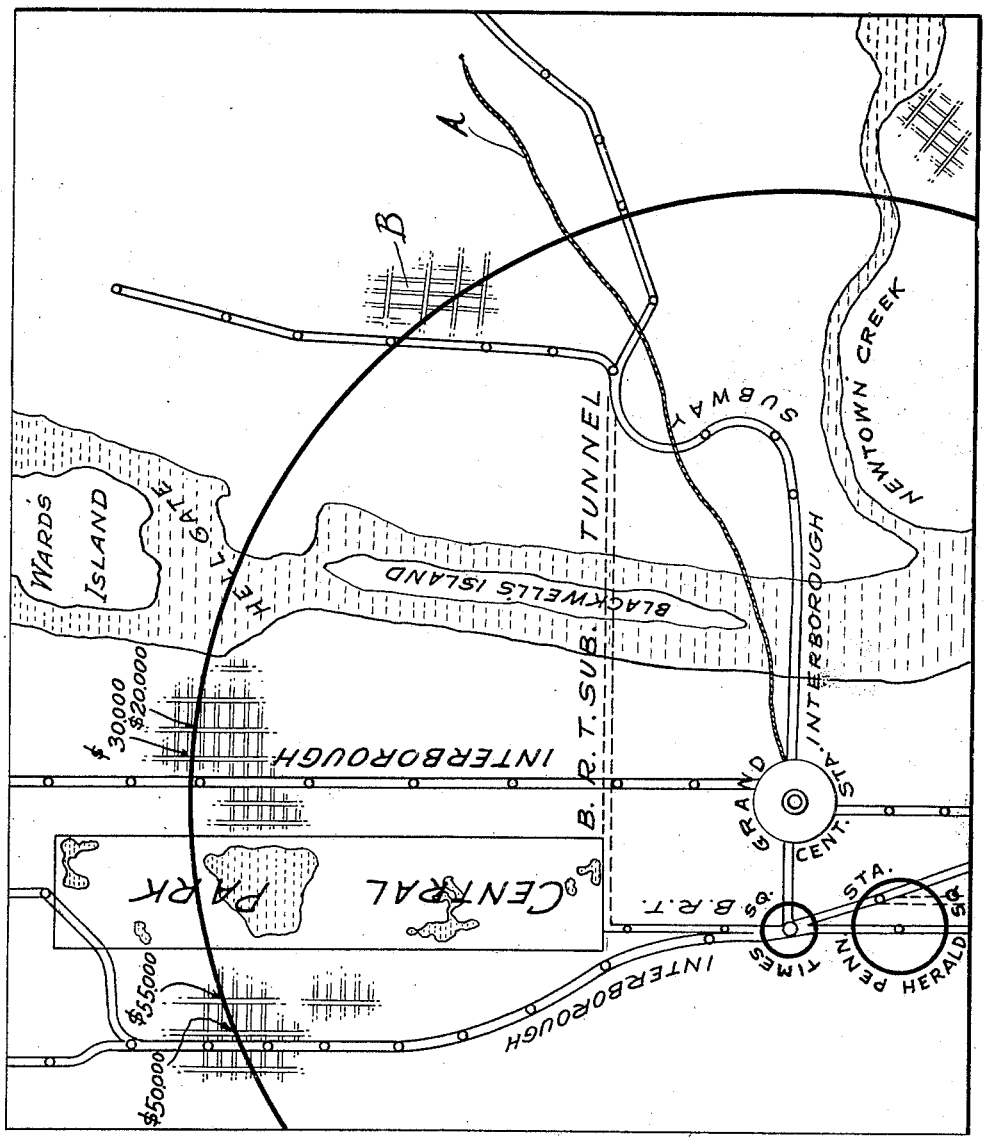
INVENTOR
JOSEPH P. DAY.
By Kerr Page Cooper + Hayward
his Attorneys.

UNITED STATES PATENT OFFICE.

JOSEPH P. DAY, OF MILBURN, NEW JERSEY.

ADVERTISING-CHART.

1,374,365.	Specification of Letters Patent.	Patented Apr. 12, 1921.

Application filed November 24, 1920. Serial No. 426,164.

*To all whom it may concern:*

Be it known that I, JOSEPH P. DAY, being a citizen of the United States of America, residing at Milburn, in the county of Essex and State of New Jersey, have invented certain new and useful Improvements in Advertising-Charts, of which the following is a full, clear, and exact description.

The improvement which forms the subject of this application for Letters Patent is embodied in an advertising circular or chart adapted for numerous purposes but more especially designed and intended for use in advertising sales of real estate in outlying or suburban sections of large cities.

The nature and purpose of the device may be most readily gathered from a consideration of the conditions which it is designed to meet and a brief statement of the manner of using the same. Assume, for example, the city of Greater New York. The owner of a tract of land in the outlying section of Brooklyn employs an auctioneer to advertise and to sell lots in the tract on a certain day. The success of the sale and the prices realized manifestly depend in large measure upon the skill with which the sale is advertised, the degree of attractiveness of the purchase which is established, and the interest which the advertiser succeeds in awakening in the public mind.

With these facts in mind I have sought to devise a means for stimulating interest and attracting attention to such sales and I have succeeded in producing a device which fully meets all the requirements and which has proved to be a most useful and attractive advertising means.

I print on a suitable sheet or folder a street plan of the city where the sale is to be held, New York, for example, and print or impress thereon the current values per foot or per lot of property situated usually in the most desirable localities. Then to some central point, such as the location of the Grand Central Station, I attach in any ready and convenient way a string of a length sufficient to cover the entire chart or map.

Anyone with this chart before him may take this string between his thumb and forefinger and move it about its point of attachment from the points where the real estate values are printed, to the point where the land is to be sold, and in this way gets a more intelligent and complete and vivid comparison of values at given radial distances from central points than could possibly be obtained from scanning circles or graphic indications by the eye.

Assume for instance that the sale is by auction, the prospective buyer may in this way compare probable or expected prices with known values at the same distance from important centers and is thus enabled to fix in his own mind the price, which under the circumstances he may be willing to bid.

The value of this invention, it will now be understood, is not so much in the means which it affords of measuring distances, as such means is extremely simple, but in the advertising effect which it produces, and this is remarkably great.

I have attached hereto a drawing which shows the invention, I have shown a partial sheet plan of a portion of the city of Greater New York and at certain points have shown the recognized values of real estate. For example, at Broadway and 93d street the value as $100,000.00 and so on, and these values may be printed in wherever desired.

The string A is attached to the point where is located the Grand Central Station, and if the sale is of property located at B in Brooklyn, an interested party may very readily see, by the use of the string, that such property is no further from the Grand Central Station than, for instance, Broadway and 93d street.

What I claim is:—

An advertising chart illustrating such localities as the plan of streets of a city with property values at different points indicated thereon having a string attached to a recognized central point on said chart for showing radial distances of points on the chart from said center and comparing values.

In testimony whereof I hereto affix my signature.

JOSEPH P. DAY.